United States Patent
Bhopi et al.

(10) Patent No.: US 12,298,880 B2
(45) Date of Patent: May 13, 2025

(54) AI AGENT FOR PRE-BUILD CONFIGURATION OF CLOUD SERVICES

(71) Applicant: Microsoft Technology Licensing, LLC, Redmond, WA (US)

(72) Inventors: Rajeev Sudhakar Bhopi, Mercer Island, WA (US); Yiwen Zhu, San Francisco, CA (US); Helen Mary Serr, Boston, MA (US); Jonah Karpman, San Diego, CA (US); Matthew Joseph Gleeson, New York, NY (US); Nicholas Kent Glaze, Cambridge, MA (US); Subramaniam Venkatraman Krishnan, San Jose, CA (US); Irwin Hollar McNeely, III, Cambridge, MA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 26 days.

(21) Appl. No.: 18/487,024

(22) Filed: Oct. 13, 2023

(65) Prior Publication Data

US 2025/0123939 A1     Apr. 17, 2025

(51) Int. Cl.
*G06F 15/16* (2006.01)
*G06F 8/70* (2018.01)
*G06F 11/34* (2006.01)

(52) U.S. Cl.
CPC ............ *G06F 11/3442* (2013.01); *G06F 8/70* (2013.01)

(58) Field of Classification Search
CPC .............................. G06F 8/70; G06F 11/3442

USPC ......................................................... 709/224
See application file for complete search history.

(56) References Cited

U.S. PATENT DOCUMENTS

| | | | |
|---|---|---|---|
| 7,308,684 B2 * | 12/2007 | Chan ......................... | G06F 8/70 719/331 |
| 8,965,548 B1 * | 2/2015 | Kamath ........... | G06Q 10/06315 700/100 |
| 9,043,752 B2 * | 5/2015 | Bagheri .................... | G06F 8/36 717/102 |
| 9,286,043 B2 * | 3/2016 | Jubran .................... | G06F 8/443 |
| 9,489,194 B2 * | 11/2016 | Kletzky .................. | G06F 9/466 |

(Continued)

OTHER PUBLICATIONS

"Gray Systems Lab", Retrieved From: https://www.microsoft.com/en-us/research/group/gray-systems-lab/, Retrieved Date: Jun. 15, 2023, 1 Page.

(Continued)

*Primary Examiner* — Moustafa M Meky
(74) *Attorney, Agent, or Firm* — Barta Jones, PLLC

(57) ABSTRACT

Example solutions provide an artificial intelligence (AI) agent for pre-build configuration of cloud services in order to enable the initial build of a computational resource (e.g., in a cloud service) to minimize the likelihood of excessive throttling or slack. Examples leverage prior-existing utilization data and project metadata to identify similar use cases. The utilization data includes capacity information and resource consumption information (e.g., throttling and slack) for prior-existing computational resources, and the project metadata includes information for hierarchically categorization, to identify similar resources. A pre-build configuration is generated for the customer's resource, which the customer may tune based upon the customer's preferences for a cost and performance balance point.

20 Claims, 12 Drawing Sheets

(56) References Cited

U.S. PATENT DOCUMENTS

| | | | | |
|---|---|---|---|---|
| 9,614,781 | B1* | 4/2017 | Goltzman | H04L 67/10 |
| 9,785,900 | B2* | 10/2017 | Kamath | G06Q 10/06315 |
| 10,270,650 | B2* | 4/2019 | Goltzman | H04L 47/78 |
| 10,671,510 | B1* | 6/2020 | Willson | G06F 11/3676 |
| 11,474,860 | B2* | 10/2022 | Moltzan | G06F 9/451 |
| 11,803,419 | B2* | 10/2023 | Moltzan | G06F 9/4881 |
| 11,886,921 | B2* | 1/2024 | Regge | G06F 9/5055 |
| 12,028,878 | B2* | 7/2024 | Jin | G06F 9/5088 |
| 2011/0307901 | A1 | 12/2011 | Blanding | |
| 2020/0082316 | A1 | 3/2020 | Megahed et al. | |
| 2021/0157640 | A1* | 5/2021 | Moltzan | G06F 9/4881 |
| 2022/0150898 | A1* | 5/2022 | Jin | G06F 9/455 |
| 2022/0164510 | A1* | 5/2022 | Reid | G06F 30/34 |

OTHER PUBLICATIONS

Agarwal, et al., "Compute And Storage Options in Azure Database for PostgreSQL—Flexible Server", Retrieved From: https://learn.microsoft.com/en-us/azure/postgresql/flexible-server/concepts-compute-storage, Aug. 11, 2023, 11 Pages.

Cahoon, et al., "Doppler: Automated SKU Recommendation in Migrating SQL Workloads to the Cloud", In Proceedings of the VLDB Endowment, vol. 15, Issue 12, Aug. 2022, pp. 3509-3521.

Grinsztajn, et al., "Why Do Tree-Based Models Still Outperform Deep Learning on Tabular Data?", In Repository of arXiv:2207.08815v1, Jul. 18, 2022, pp. 1-33.

Kasturi, Sain., "XGBOOST vs LightGBM: Which algorithm wins the race!!!", Retrieved From: https://towardsdatascience.com/lightgbm-vs-xgboost-which-algorithm-win-the-race-1ff7dd4917d, Jul. 11, 2019, 8 Pages.

Rzadca, et al., "Autopilot: Workload Autoscaling at Google", In Proceedings of the Fifteenth European Conference on Computer Systems, Apr. 27, 2020, 16 Pages.

Zhang, et al., "HALO: Hierarchy-Aware Fault Localization for Cloud System", In Proceedings of the 27th ACM SIGKDD Conference on Knowledge Discovery & Data Mining, Aug. 14, 2021, 11 Pages.

International Search Report and Written Opinion received for PCT Application No. PCT/US2024/048036, Jan. 9, 2025, 14 pages.

* cited by examiner

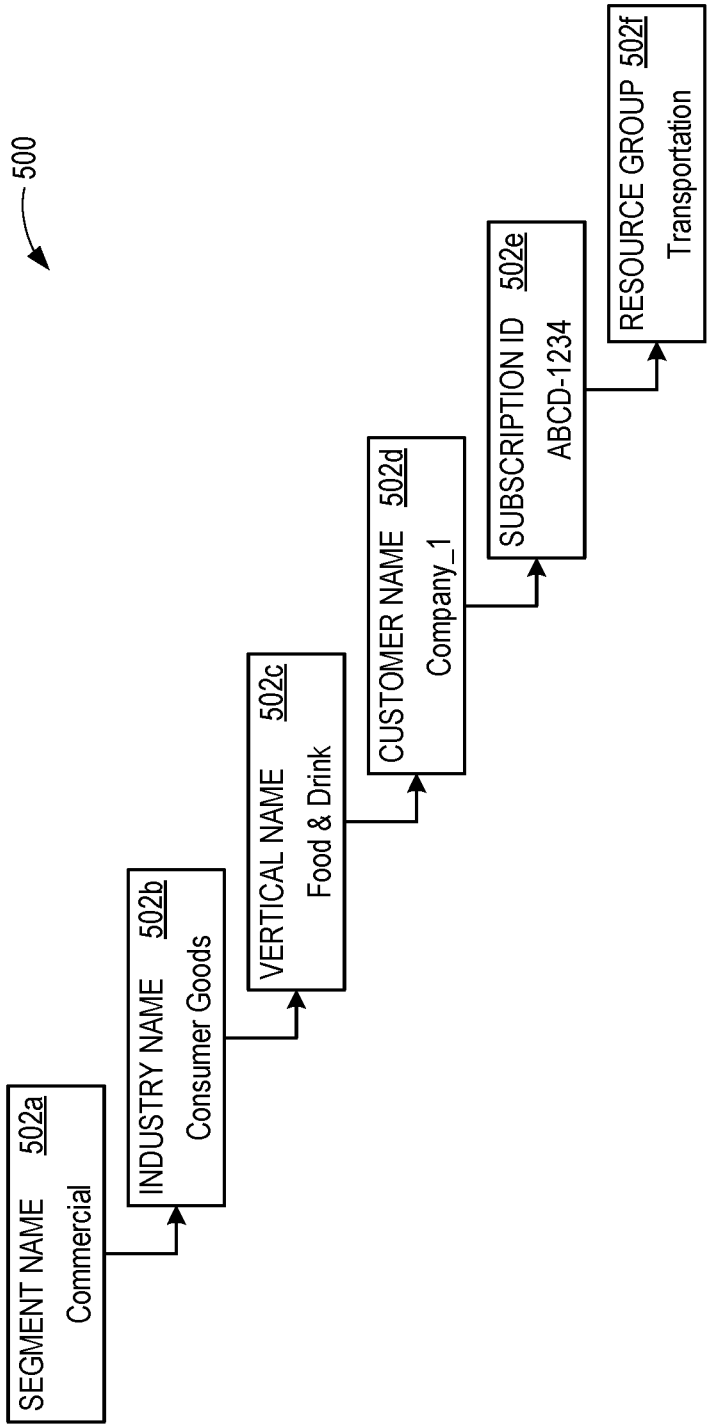

AI AGENT FOR PRE-BUILD CONFIGURATION OF CLOUD SERVICES

BACKGROUND

The availability of public cloud services has facilitated access to a wide range of data services with diverse data analytic requirements, such as SQL/NoSQL databases, streaming, machine learning (ML), business insight analysis, and others. However, the complexity of configuring an optimal arrangement increases significantly when a large number of choices are exposed. Translating use cases into cloud service resource capability provisioning requirements is challenging. If a cloud service customer configures a resource too low (e.g., too few processors), throttling, which occurs when a resource is overwhelmed, damages performance. If the resource is configured to generously, it experiences slack (unused capacity), which means that the cloud service customer is paying for unnecessary capacity.

Customers may tailor a resource based on a period of performance history (e.g., using support tickets to add or remove capacity), but this approach requires collecting the performance history during a period of possible throttling or excessive slack. That is, the customer suffers from poor performance or wastes money until figuring out the efficient level of resource capability that is needed.

SUMMARY

The disclosed examples are described in detail below with reference to the accompanying drawing figures listed below. The following summary is provided to illustrate some examples disclosed herein.

Example solutions provide an artificial intelligence (AI) agent for pre-build configuration of cloud services. Examples receive prior-existing utilization data and project metadata, wherein the utilization data comprises capacity information and resource consumption information for prior-existing computational resources, and wherein the project metadata includes information for hierarchically categorizing the prior-existing computational resources; create, using the utilization data and project metadata, a capacity prediction model for generating a pre-build configuration for a first computational resource; generate, using the capacity prediction model, the pre-build configuration for the first computational resource; and tune the pre-build configuration using a selected cost and performance balance point and prior-existing project history data. A capacity prediction model may take on different forms, based on the available metadata: a hierarchical model and a target encoding model.

BRIEF DESCRIPTION OF THE DRAWINGS

The disclosed examples are described in detail below with reference to the accompanying drawing figures listed below:

FIG. 5 illustrates an exemplary hierarchy of one form of a capacity prediction model, as may be used in example architectures such as that of FIG. 1;

Corresponding reference characters indicate corresponding parts throughout the drawings.

DETAILED DESCRIPTION

Aspects of the disclosure provide an artificial intelligence (AI) agent for pre-build configuration of cloud services to minimize the likelihood of excessive throttling or slack in an initial build of a computational resource (e.g., in a cloud service). Examples leverage prior-existing utilization data and project metadata to identify similar use cases. The utilization data includes capacity information and resource consumption information (e.g., throttling and slack) for prior-existing computational resources, and the project metadata includes information for hierarchical categorization, enabling identification of similar projects and resources. A pre-build configuration is generated for a customer's resource, which the customer may tune based upon the customer's preferences for a cost and performance balance point. A capacity prediction model is used that takes different forms, based on the available metadata: a hierarchical model and a target encoding model.

Aspects of the disclosure reduce the count of computing resources used by customers of cloud services by providing pre-build configurations that reduce the likelihood of excessive slack. Aspects of the disclosure further improve the performance of computing resources, including the underlying devices, used by customers of cloud services by providing pre-build configurations that reduce the likelihood of excessive throttling. This is accomplished, at least in part, by creating a capacity prediction model for generating a pre-build configuration for a first computational resource, using utilization and data project metadata for prior-existing computational resources. Thus, aspects of the disclosure solve a problem unique to the domain of computing.

The various examples are described in detail with reference to the accompanying drawings. Wherever preferable, the same reference numbers are used throughout the drawings to refer to the same or like parts. References made throughout this disclosure relating to specific examples and implementations are provided solely for illustrative purposes but, unless indicated to the contrary, are not meant to limit all examples.

Figure 1:
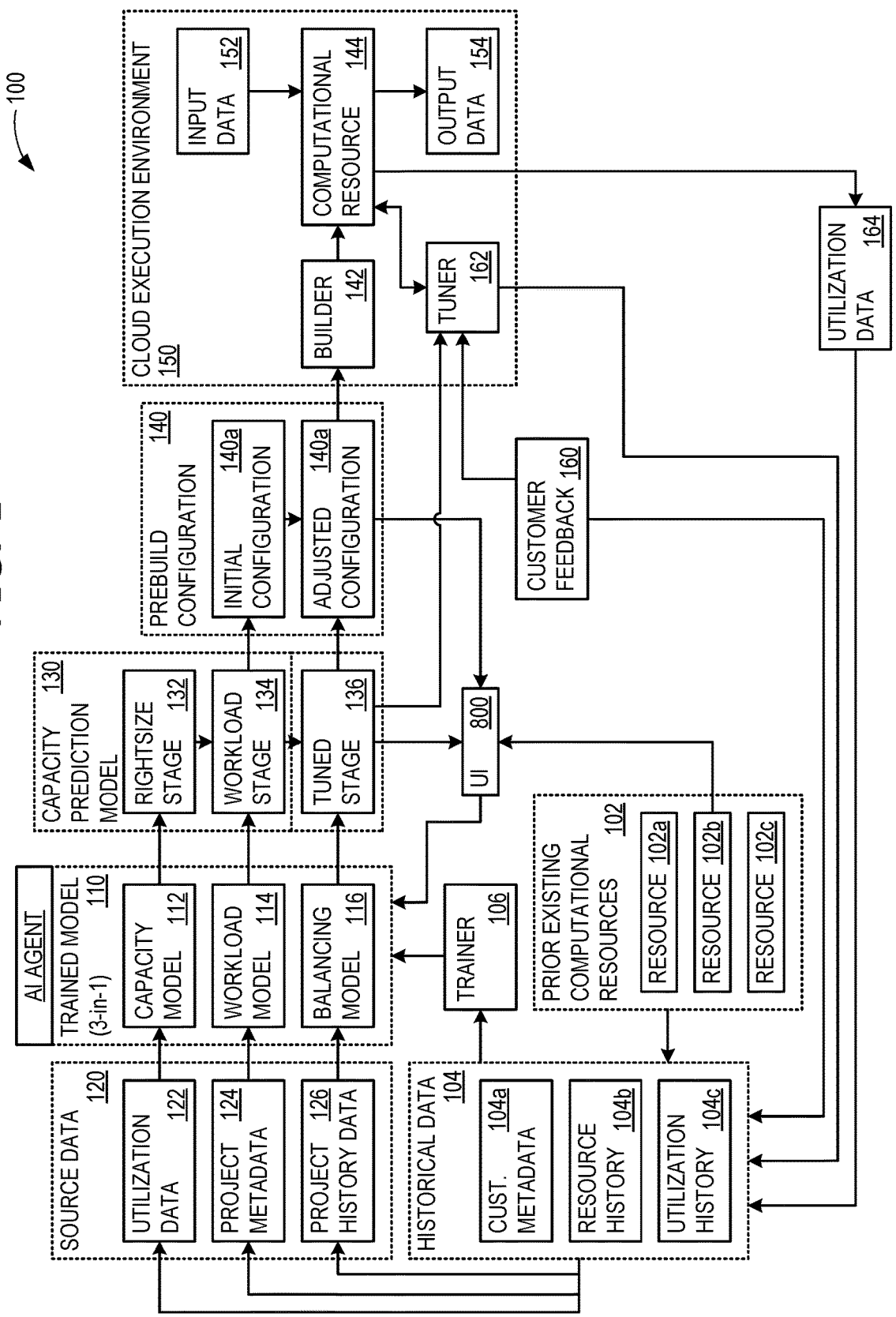
FIG. 1 illustrates an example architecture that advantageously provides an artificial intelligence (AI) agent for pre-build configuration of cloud services.

FIG. 1 illustrates an example architecture 100 that advantageously provides an AI agent (a trained model 110) for pre-build configuration of cloud services. Specifically, trained model 110 (the AI agent) generates a pre-build configuration 140 for provisioning a computational resource 144 that executes to generate output data 154 from input data 152, while simultaneously minimizing the likelihood of excessive throttling (e.g., avoiding under-provisioning) and minimizing the likelihood of excessive slack (e.g., avoiding over-provisioning).

Figure 2A:
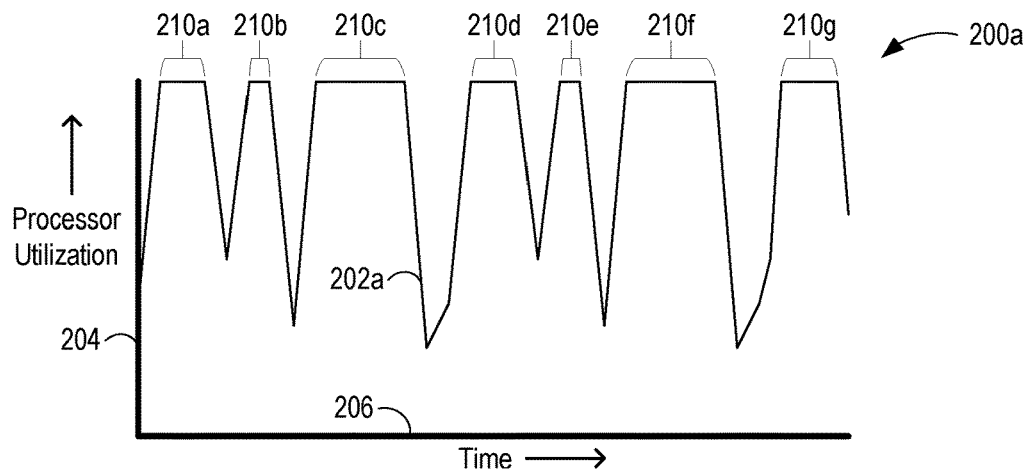
FIG. 2A illustrates excessive throttling of a computational resource, which example architectures such as that of FIG. 1 may prevent.
Figure 2B:
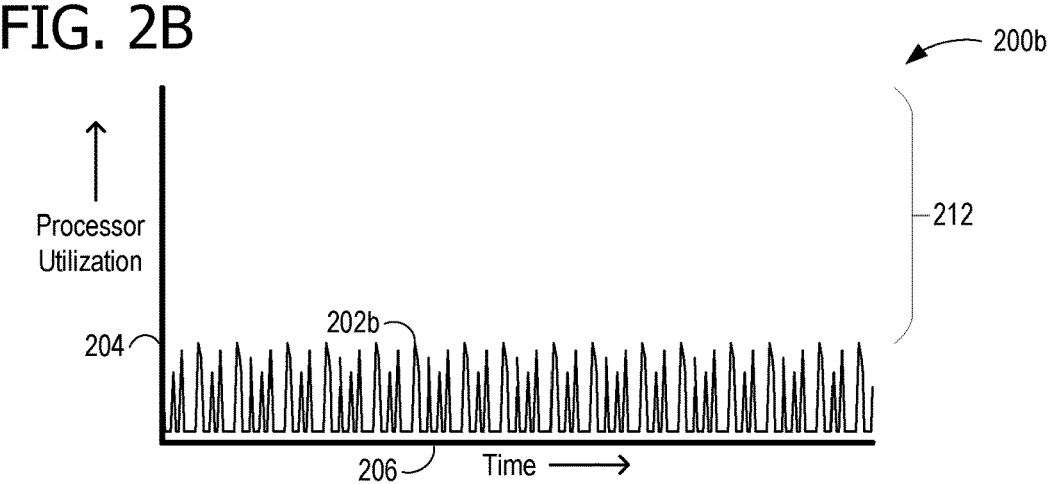
FIG. 2B illustrates excessive slack for a computational resource, which example architectures such as that of FIG. 1 may prevent.
Figure 2C:
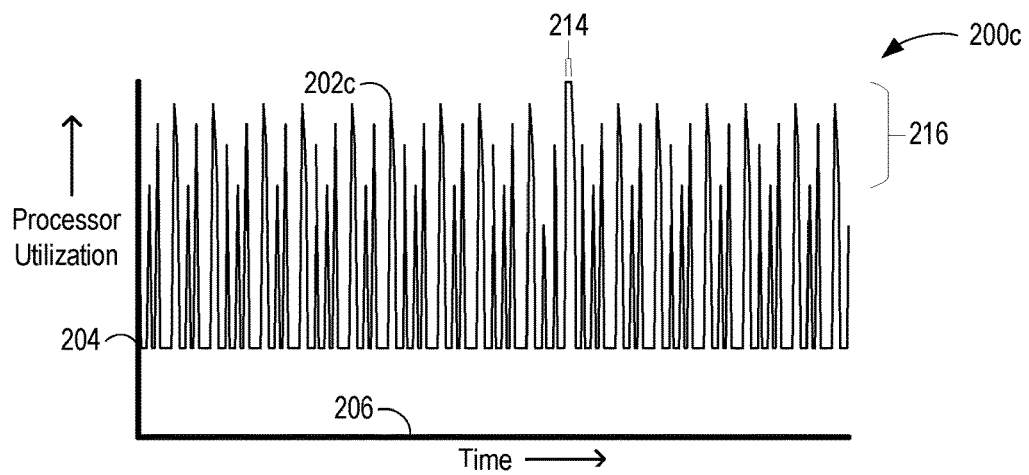
FIG. 2C illustrates a scenario in which a computational resource has achieved an optimal balance between throttling and slack, as may be achieved by using example architectures such as that of FIG. 1.

FIGS. 2A-2C describe throttling, slack, and optimizing for a balance point, between a target throttling rate and a target slack rate. FIG. 2A illustrates excessive throttling of a computational resource, which may be avoided by using examples of architecture 100. A graph 200a shows a curve 202a that plots processor utilization (axis 204) against time (axis 206). Curve 202a reaches a maximum value and plateaus in throttling incidents 210a, 210b, 210c, 210d, 210e, 210f, and 210g. Throttling incidents 210a-210g occur when the demand for processor performance exceeds some threshold of maximum available capacity, such as 95%, as a result of under-provisioning (e.g., too few processor cores or slow processors) for the current task. This may result in overall resource performance, as experienced by the customer, suffering degradation. Certain data processing or retrieval jobs may take longer than expected (e.g., longer than in the absence of throttling) or be canceled altogether.

Although processor utilization is plotted, other performance curves may also be used to reflect under-provisioning, such as memory utilization, which drives the use of slower swap space to relieve memory pressure, in some scenarios, and storage usage, which results in faults when there is insufficient room to persist data in the provisioned permanent storage. In cloud service provisioning, virtual machines (VMs) may be used, meaning that the processor cores, memory, and storage are all virtualized. In some examples, error rates are used in place of throttling as a metric to indicate performance degradation due to under-provisioning.

FIG. 2B illustrates excessive slack for a computational resource, which also may be avoided by using examples of architecture 100. A graph 200b shows a curve 202b that plots processor utilization (axis 204) against time (axis 206). Curve 202b shows a large gap between its typical maximum values and the resource's maximum capacity. This is identified notionally as slack 212, although the definition of slack is more involved.

In some examples, an average slack ($slack_{average}$) is defined using a time series in:

$$\text{slack}_{average}(c) = \frac{1}{n}\sum_{t \in \{t_1,\ldots,t_n\}} \text{slack}(t) \qquad \text{Eq. (1)}$$

where c is the capacity, and slack is the instantaneous slack at time sample t.

Although processor utilization is plotted, other performance curves may also be used to reflect over-provisioning, such memory utilization and storage usage, which may go unused in cases of over-provisioning.

FIG. 2C illustrates a scenario in which a computational resource has achieved an optimal balance ("rightsizing") between throttling and slack, by using an example of architecture 100. A graph 200c shows a curve 202c that plots processor utilization (axis 204) against time (axis 206). Curve 202c shows a target throttling rate 214 that is smaller than the time periods of throttling incidents 210a-210g, and a smaller gap between its typical maximum values and the resource's maximum capacity, notionally a target slack rate 216, than slack 212.

In some scenarios, customers may be more sensitive to throttling than slack, and so a hard constrain may be set for throttling, and the capacity that achieves the closest expected average slack is used. In some examples, the capacity c that optimizes pre-build configuration 140 (of FIG. 1) for target slack rate 216 (given by k in Eq. (2)) and a target throttling rate 214 (given by r in Eq. (2)) is found by selecting c within a set of available capacity configurations C that minimizes the difference between target slack rate 216 and the average slack ($slack_{average}$) of Eq. (1), subject to the probability of throttling, P, for that capacity, P(c), being below target throttling rate 214. This is shown as:

$$\min_{c \in C} |k - \text{slack}_{average}(c)| \text{ s.t. } P(c) < \tau \qquad \text{Eq. (2)}$$

In some examples, target throttling rate 214 may be set to 0 (zero), and target slack rate 216 may be set to 50%. Other values for target throttling rate (e.g., non-zero values) and other values of target slack rate 216 may be used, based on customer preference.

Multiple computational resource capacities, such as processor count (and speed), amount of memory, and storage space (capacity) may need to be individually optimized. For example, if a computational resource is used for database applications, processor count and speed performance may be lower, relative to memory and storage, while still providing acceptable performance, than if the computational resource is instead used for heavy computations on relatively small quantities of data.

Returning to FIG. 1, prior-existing computational resources 102 are computational resources that had been built and used by earlier customers, and so have performance histories which may be leveraged for generating pre-build configuration 140 for anew customer project, such that pre-build configuration 140 is optimized for target throttling rate 214 and target slack rate 216 (i.e., satisfies Eq. (2)). Prior-existing computational resources 102 includes a prior-existing computational resource 102a, a prior-existing computational resource 102b, and a prior-existing computational resource 102c.

As will be described below, prior-existing computational resource 102b is used for explainability for the customer (in a user interface (UI) 800) of how trained model (the AI agent) generated pre-build configuration 140. Explainability may not be used in some examples, although it may be used for training some new customers or other users of architecture 100.

Historical data 104 is collected from activities of prior-existing computational resources 102, and includes a customer metadata 104a, a resource solution history 104b, and a resource health and utilization history 104c. Resource solution history 104b contains information such as processor counts and speeds, amount of memory, and storage capacities for prior-existing computational resources 102, and provides the set of available configurations C of Eq. (2).

Resource health and utilization history 104c has throttling and slack information for each of the resources in prior-existing computational resources 102, such as collected on a per-second basis and processed for statistical properties, which may be stored more efficiently. Resource health and utilization history 104c includes information on the owners of the resources in prior-existing computational resources 102, such as industry, and segment.

Customer metadata 104a contains information such as the industry in which a customer operates, departments within a customer organization (referred to as "resource groups") that may each have their own projects, and other data that enables characterizing a particular project in order to determine other projects by other customers that may be more similar or less similar. For example, two customers who are both in the food service industry may have similar requirements for cloud resources, although differences in the department may result in divergence of similarities. For example, a single entity in the food service industry may have a transportation department and a marketing department, with significantly different needs. For example, for the transportation department, a delivery and route planning function may have a critical need to avoid throttling (or other performance degradation), whereas the marketing department may have less sensitivity to throttling, and higher sensitivity to cost (e.g., a higher need to reduce slack).

Collecting this resolution of data enables the generation of a hierarchy of similarities, which improves the reliability of pre-build configuration 140. In some examples, at least some portions of historical data may be anonymized. In some examples, historical data 104 has histories for tens of thousands of projects, with daily updates (or more often for some data), indexed by customer, subscription, and resource group (department), and stratified by offering type, such as burstable (development), general purpose (small production), and memory optimized (large production). Projects may be clustered by the prevalence of workload spikiness, in order to better match this dimension of project performance when generating pre-build configuration 140.

A trainer 106 uses historical data 104 to train trained model 110 to generate a capacity prediction model 130 that in turn produces pre-build configuration 140. Capacity prediction model 130 may take different forms, based on the available metadata: a hierarchical model and a target encoding model. This is explained in relation to FIGS. 4A and 4B.

Pre-build configuration 140 provides a customer-specific recommendation for configuring cloud service resources, such as VMs. In some examples, pre-build configuration 140 specifies processor count (and speed), amount of memory, and storage capacity. In some examples, trained model 110 comprises a single model, including a machine learning (ML) model. As used herein, AI includes, but is not limited to, ML. In some examples, trained model 110 comprises three distinct models, a capacity model 112, a workload prediction model 114, and a balancing model 116, which will be described, below. In some examples, capacity model 112 and workload prediction model 114 are combined into a single model (or ML model).

In some examples, trainer 106 performs ongoing training of trained model 110 (e.g., continues training one or more of capacity model 112, workload prediction model 114, and balancing model 116). For example, after pre-build configuration 140 is generated, and a builder 142 builds computational resource 144 based on pre-build configuration 140, computational resource 144 may begin executing within a cloud execution environment 150. This begins developing a history for computational resource 144.

For example, customer feedback 160, in the form of customer reported incidents (CRI) and support tickets, is provided to a tuner 162 that adjusts the capacity of computational resource 144. Customer feedback and capacities (and capacity change events) are added to historical data 104. Additionally, utilization data, such as workload (including spikiness information), throttling, and slack, are included in utilization data 164 for computational resource 144. This is also added to historical data 104, for example, within resource health and utilization history 104c. These additions to historical data 104 provide new training material for trainer 106 to use in further training of trained model 110.

Trained model uses source data 120 that includes utilization data 122, project metadata 124, and project history data 126, extracted from historical data 104. Utilization data 122 comprises capacity information, resource consumption information, and workload information for prior-existing computational resources. The capacity information comprises processor count, sometimes processor speed, amount of memory, and/or storage capacity for each of prior-existing computational resources 102, with possibly different values over time as those resources are tuned (upsized or downsized). In some examples, each processor in the processor count comprises a virtual core (vcore). In some examples, the resource consumption information slack information and/or throttling information, as were described in relation to FIGS. 2A and 2B, along with workload information. In some examples, telemetry for each resource's utilization is provided at one minute intervals.

Project metadata 124 includes information for hierarchically categorizing prior-existing computational resources 102, such as metadata tags (e.g., categorization identifications for a customer or resource). Examples include software versions, localization tags (e.g., the region or country in which a resource resides), or development/test/production tags. Both resource-specific tags (e.g., dev/test/prod) and broader customer-related tags (e.g., industry and other segmentation data) may be used to allow intelligent recommendations for both existing and new customers. In some scenarios, a hierarchy of metadata is leveraged, beginning with subscription identifiers (IDs) all the way up to broad segmentation tags such as industry names (e.g., Food and Drink or Food Service, Manufacturing, Consumer Electronics).

Resource-specific tags, such as software version and dev/small-prod/large-prod may be pulled from the same sources as capacity and utilization data. Customer metadata (e.g., subscriptions and resource groups) may be inferred from resource ID paths in utilization tables or pulled from a customer subscription metadata. Customer data may be anonymized and processed for uniformity.

Figure 6:
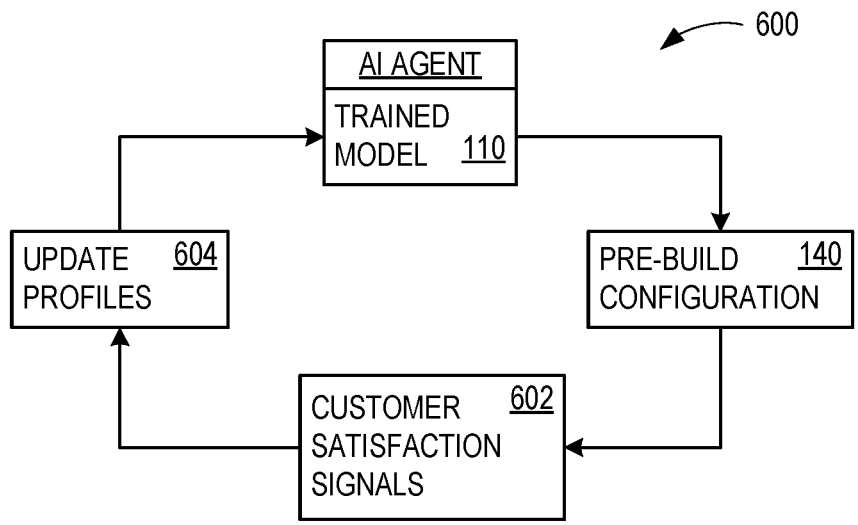
FIG. 6 illustrates another exemplary workflow used by example architectures such as that of FIG. 1.

Project history data 126 comprises requested changes or reported incidents for prior-existing computational resources 102, and includes customer satisfaction signals 602 (of FIG. 6). Project history data 126 may include anything that indicates a cost sensitivity (e.g., a customer prefers less expensive offerings and is willing to take slight performance hits to reduce cost) and a performance sensitivity (e.g., a customer prefers higher performance offerings and is willing to pay more to avoid throttling). Examples include support tickets and manual scaling actions on resources (e.g., using tuner 162). CRIs may be used and labeled as cost-sensitive or performance-sensitive using a keyword search or a large language model (LLM) to extract a representation of the CRI. This is shown below in FIG. 7.

Some existing customers may use multiple computational resources, for example, with different departments (resource groups, such as transportation and marketing), and the different departments may each have their own profile.

Customer satisfaction signals 602 (see FIG. 6) from an existing customer are propagated into that project's profiles by weighted addition, in some examples. For example, if a customer makes a complaint about performance for a resource used by one of its departments, that signal will have full impact on the profile for the project used by that department, but a reduced (e.g., lower weighted) impact on profiles of projects for that same customer's other departments.

Trained model 110 uses three stages, each of which provides a type of capacity recommendation. Stage 1 is capacity rightsizing that computes the ideal capacity, using most or all of the prior-existing computational resources 102 that had been used in the training. This is illustrated by capacity model 112 producing a capacity rightsizing stage 132 in capacity prediction model 130. Stage 2 is workload prediction that recommends the best capacity for a newly-requested resource (e.g., pre-build recommendation), starting with capacity rightsizing stage 132 as a base. This is illustrated by workload prediction model 114 producing a workload prediction stage 134 in capacity prediction model 130. No matter how accurate a workload prediction stage 134 is, different customers may have different preferences. This situation is addressed by balancing model 116.

Stage 3 is balancing, or personalization, that tunes (e.g., adjusts) the recommendations computed in Stage 2 (e.g., workload prediction stage 134) based on a customer's preferences for cost versus performance. This is illustrated by balancing model 116 producing a tuned stage 136. In some examples, tuned stage 136 is considered to be within capacity prediction model 130, as a third stage, whereas, in some examples, capacity prediction model 130 has only two stages (capacity rightsizing stage 132 and workload prediction stage 134) and tuned stage 136 falls outside of capacity prediction model 130.

The three stages may all be used together or independently. For example, for pre-build configurations, Stage 2 is required, and Stages 1 and 3 are optional, in some examples. Using all three stages together to generate pre-build configuration 140 may be viewed as a two-phase approach: produce an initial pre-build configuration 140a using Stages 1 and 2 as the first phase, then upon receiving customer input for preferences after seeing the initial pre-build configuration 140 (in UI 800, as described below for FIG. 8), personalizing pre-build configuration 140 in the second phase as an adjusted pre-build configuration 140b. Additionally, Stage 3 may be used to tune computational resource 144 after computational resource 144 is built and had begun executing, for example by providing input to tuner 162.

Capacity model 112 produces capacity rightsizing stage 132 by assessing the relationship between resource workloads and capacities, identifying opportunities for cost savings through downsizing or performance gains through upscaling. This stage may be considered to be identifying the goodness of fit of a given resource capacity to a workload. For example, a workload that often requires three processors (e.g., processor cores, or vcores) may be recommended to scale up from two processors to four processors for tuning that resource, to realize improved performance, and contribute to a pre-build recommendation for four processors.

Rightsizing requires two inputs: the utilization of a resource, and the capacity of the resource. In some scenarios, capacity may not change much over time, whereas workload typically changes on short timescales. Thus there may be a difference in the frequency at which capacity and workload information are recorded. Some examples may operate on aggregated values, such as peak resource utilization or average unused resource capacity. However, when a resource experiences throttling, the true workload is not observable. These are referred to as censored workloads. For these scenarios, an alternate rightsizing method is employed. For example, censored workloads are rightsized under the assumption that what throttles at one capacity will not throttle at the next larger capacity choice.

Workload prediction model 114 produces workload prediction stage 134 by leveraging capacity rightsizing stage 132 along with metadata describing the new customer and the new requested resource (e.g., what will become computational resource 144). This task may be described as: Given a vector M of metadata describing a customer and their requested resource with offering type O, define a function $Y=f(M,O)$ that recommends the best resource capacity (e.g., pre-build configuration 140).

Figure 8:
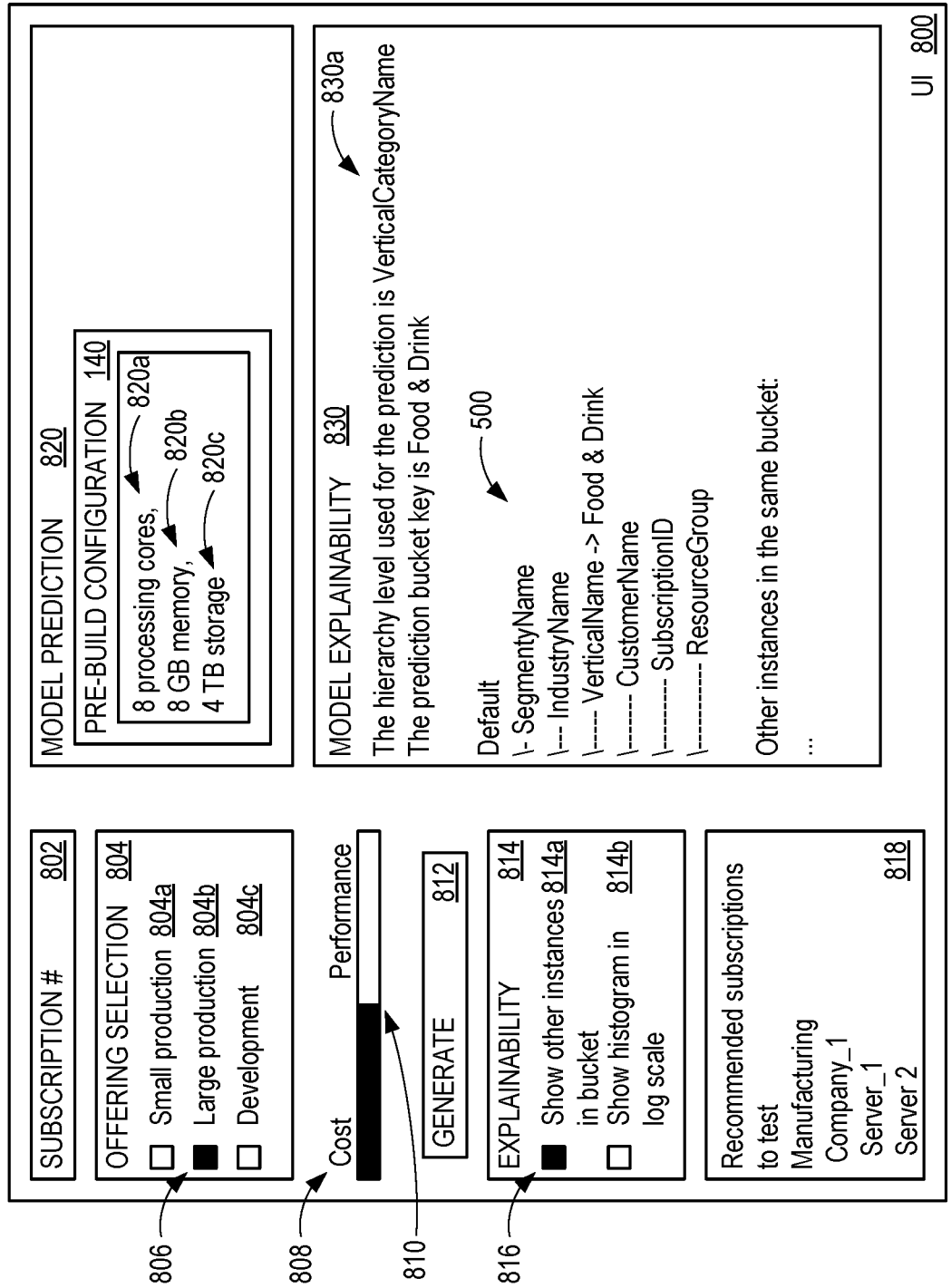
FIG. 8 illustrates an exemplary UI as seen by a viewer, using example architectures such as that of FIG. 1.

The requested offering type O corresponds to burstable (e.g., development), general purpose (e.g., small production), and memory optimized (e.g., large production), and is shown as a UI input in FIG. 8. In some examples, there may be a different set of possible capacities for each offering type. Some examples stratify predictions using the offering type, restricting the configurations to ensure a valid capacity for a given stratum. For example, burstable offerings may be provisioned with a single processor, whereas general purpose and memory optimized offerings may have a minimum of two processors.

This stage is powered by metadata tags, which are discrete attributes that may take on arbitrary values. Metadata tags may range from software versions to resource URI path information (resource group, subscription, etc.) to customer segmentation data (e.g., industry names). The metadata tags are generally related to underlying workloads, such as test/dev/prod tags, and are useful for relating similar workloads and enabling prediction of typical workloads for newly-requested resources.

Balancing model 116 produces tuned stage 136 by personalizing workload prediction stage 134 according to the new customer's preferences for cost versus performance. Balancing model 116 may use disparate sources such as subscription metadata, resource metadata, customer interactions, and VM telemetry. Balancing model 116 may learn each customer's (or customer's departments') cost versus performance preferences by assessing historical customer interactions with resource provisioning, scaling actions, and performance-related CRIs.

Figure 1A:
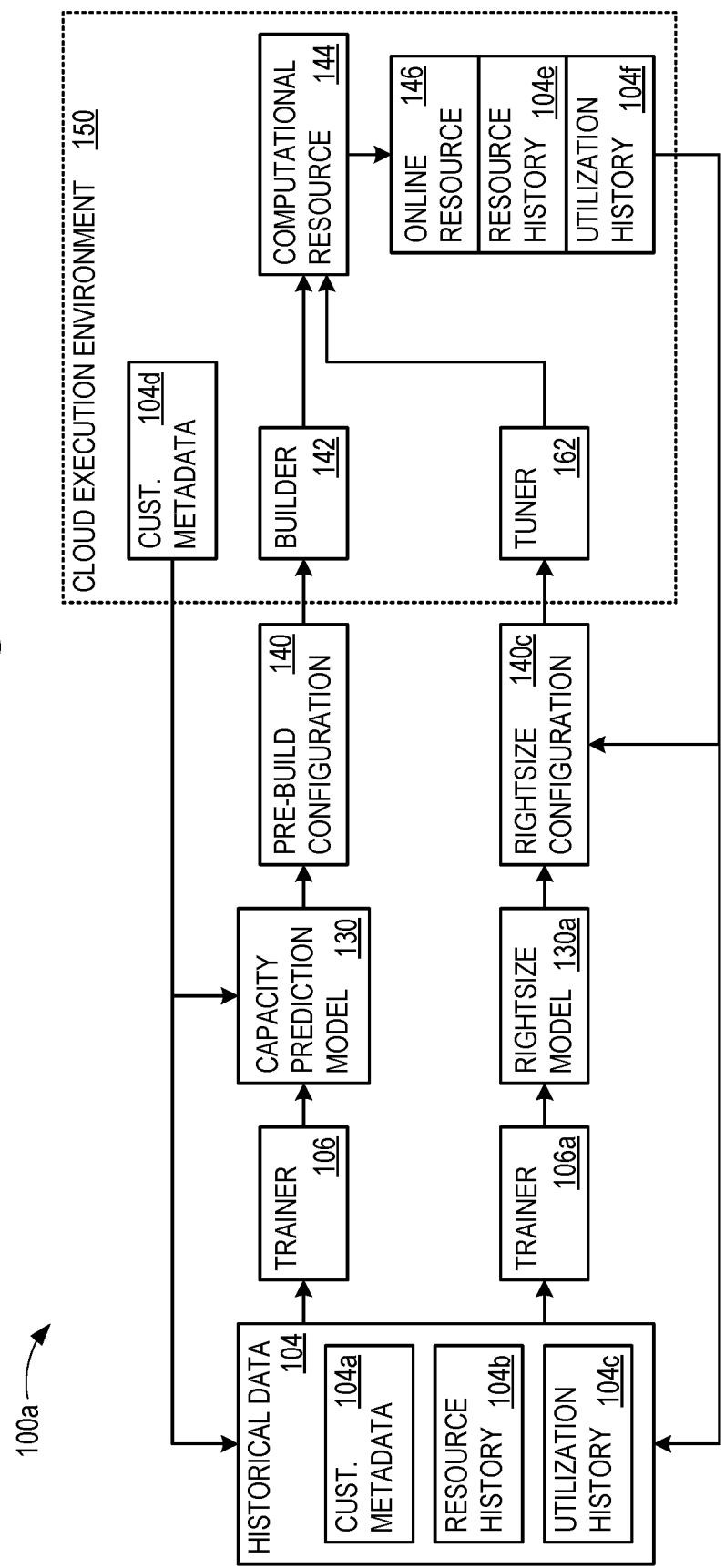
FIG. 1A illustrates an alternative rendering of the architecture of FIG. 1, which illustrates both pre-build configuration and rightsizing of cloud services.

An alternative architecture 100a, is shown in FIG. 1A. Unless otherwise specified or impractical, later references to architecture 100 also refer to architecture 100a. Architecture 100a leverages historical data 104 for training, using both trainer 106, as described above, and also a trainer 106a. Trainer 106 provides training to construct capacity prediction model 130 that determines pre-build configuration 140, whereas trainer 106a provides training to construct rightsize model 130a that determines rightsize configuration 140. Pre-build configuration 140 is for the initial construction of computational resource 144 (via builder 142), attempting to get it to the proper size for the customer at the beginning.

However, rightsizing is employed in scenarios in which pre-build configuration 140 is not ideal, and also whenever the customer needs (e.g., workloads) change. Even if pre-build configuration 140 is initially ideal, it may not remain ideal over time. Thus, rightsize model 130a determines rightsize configuration 140, which is used by tuner 162 to adjust the size/capacity of computational resource 144.

As illustrated, new customer metadata 104d, associated with the new project that builds computational resource 144, and is used in the generation of capacity prediction model 130. However, customer metadata 104d is added into historical data 104, to use for improving future new projects.

Computational resource 144 spawns an online resource 146, which generates new resource solution history 104e and resource health and utilization history 104f with use over time. Resource solution history 104e and resource health and utilization history 104f are used for rightsizing, for example used in the generation of rightsize model 130a. Resource solution history 104b and resource health and utilization history 104c are also added into historical data 104, to use for improving future new projects.

Figure 3:
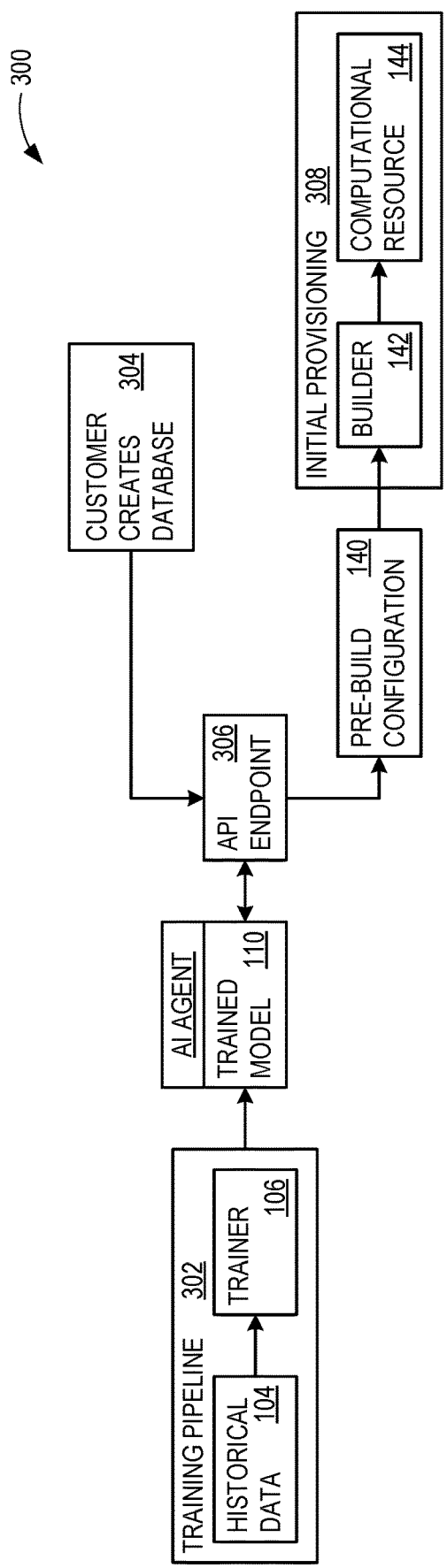
FIG. 3 illustrates an exemplary workflow used by example architectures such as that of FIG. 1.

FIG. 3 illustrates an exemplary workflow 300 used by examples of architecture 100. In a training pipeline 302, trainer 106 trains trained model 110 using historical data 104. A customer creates a database in operation 304 and uses an API endpoint 306 to access trained model 110. Trained model 110 generates pre-build configuration 140, which is passed to an initial provisioning operation 308 in which builder 142 builds computational resource 144 based on pre-build configuration 140.

Figure 4A:
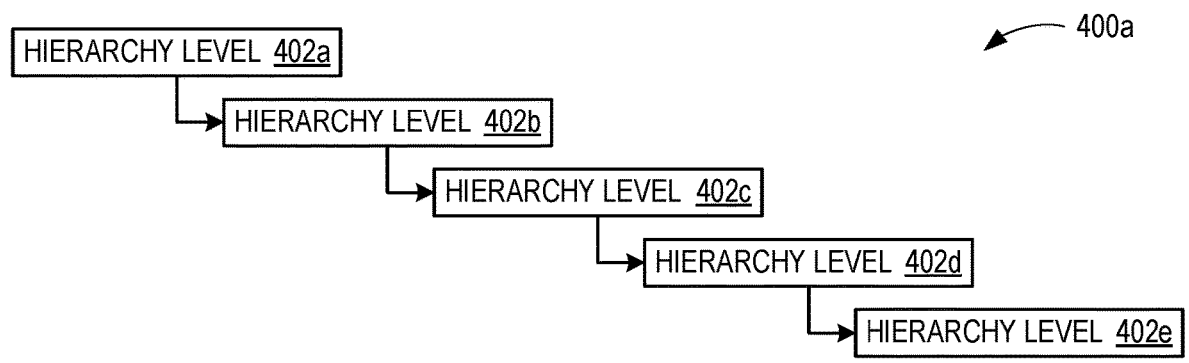
FIGS. 4A and 4B illustrate different options for filtering or encoding metadata, as may be used in example architectures such as that of FIG. 1.
Figure 4B:
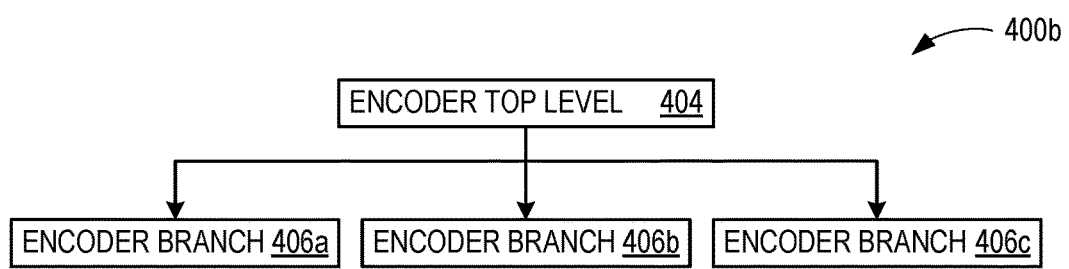

FIGS. 4A and 4B illustrate different options for filtering or encoding metadata. Examples of architecture 100 may use a hierarchical filter 400a (or hierarchical provisioner) of FIG. 4A as the underlying model, or may instead use a target encoder 400b (or target encoding provisioner) of FIG. 4B as the underlying model. The selection of hierarchical filter 400a versus target encoder 400b depends on the nature of project metadata 124. If project metadata 124 is sufficiently hierarchical (see FIG. 5), hierarchical filter 400a is used and capacity prediction model 130 takes the form of a hierarchical model. If, however, insufficient hierarchy exists, target encoder 400b is used, and capacity prediction model 130 takes the form of a target encoding model.

FIG. 4A provides a notional illustration of hierarchical filter 400a that includes a top hierarchy level 402a, a hierarchy level 402b, a hierarchy level 402c, a hierarchy level 402d, and a hierarchy level 402e. Hierarchical filter 400a uses a heuristic approach that leverages the inherent hierarchical structure of some metadata features to make capacity recommendations based on similar customers' prior-existing computational resources. This approach uses several stages: (1) computing the hierarchical structure of the metadata features, (2) sorting each observed prior-existing computational resources into buckets along this hierarchy, and (3) recommending the capacity for a new computational resource (e.g., computational resource 144) using the populated buckets.

Some examples compute pairwise hierarchical relationships between features to construct a hierarchy graph. In this approach, pairwise entropy is calculated, and from it, uncertainty reduction is computed, and then a table of hierarchy intensity values. The table may include moderately strict hierarchical relationships, along with some near-strict and some weak hierarchical relationships. To ensure that only meaningful relationships are included in the final hierarchy, a minimum pairwise entropy threshold value is used, with all values below the threshold set to zero.

To compute a hierarchy chain, a weighted directed acyclic graph (DAG), is constructed, using the thresholded table as the adjacency matrix. That is, an edge pointing from one node to another, of the table value between the nodes is not zero (which may have been set to zero as a result of the thresholding). The most granular feature in the hierarchy is the node in the DAG with the highest out-degree (i.e. the row in the table with the most non-zero values). To extract the remaining elements of the hierarchy chain, the DAG is traversed through each successive node's neighbor with the highest out-degree. The chain terminates at the first node reached with an out-degree of 0 (i.e. the coarsest feature).

Next, each prior-existing computational resource is sorted into buckets along the computed hierarchy. Other sorting schemes may also be used, in some examples. The most optimal (e.g., optimized) capacity for a new computational resource (e.g., c in Eq. (2)) is found by using the populated buckets by first selecting the most granular metadata feature value with a non-empty bucket. Next, a percentile of the bucket's distribution of target capacities is calculated as the capacity recommendation. Some examples use the 50th percentile (e.g., median). Because the ultimate recommendation is a simple percentile of existing workloads in a bucket, the recommendation can be explained by the hierarchy level used to identify similar resources, and the list of existing computational resources in that bucket and their capacities. This is shown in FIG. 8, below.

FIG. 4B provides a notional illustration of target encoder 400b that includes an encoder top level 404, and an encoder branch 406a, an encoder branch 406b, and an encoder branch 406c in a corporate feed structure. Target encoder 400b learns arbitrary relationships within the metadata. The target encoding approach enables classical ML algorithms, such as random forest and gradient-boosted trees by encoding categorical, potentially high-cardinality attributes as real numbers using grouped aggregates of the regression target. This tends to outperform other encodings (e.g. one-hot encoding), particularly in the case of tree-based methods.

This approach may use two stages: (1) For each attribute, target value, and value, an aggregation function, such as a mean or percentile is mapped. This value may represent the average processor count selected for all customers sharing the same value for the attribute. (2) After transforming the features in the data (e.g., the features learned in the hierarchy model) with the function, regression is used to estimate the target value, given the attribute. For the explainability (see FIG. 8), the average target value for each bucket which served as input to the prediction model is shown.

FIG. 5 illustrates an exemplary hierarchy 500 of capacity prediction model 130 (when capacity prediction model takes the form of a hierarchical model), with example values. Hierarchy 500 has segment name 502a as the top level, industry name 502b as the next level, vertical name 502c as the next level, customer name 502d as the next level, subscription ID 502e as the next level, and resource group 502f (e.g., department) as the lowest level illustrated. Other hierarchical arrangements are possible, with different names and different numbers of levels.

FIG. 6 illustrates an exemplary workflow 600 used by examples of architecture 100. Trained model 110 generates pre-build configuration 140, which is used to build computational resource 144. During execution of computational resource 144, the customer provides customer satisfaction signals 602, such as requested changes (scaling actions) or reported incidents (e.g., CRIs) for computational resource 144. Customer satisfaction signals 602 are used to update project profiles 708 (see FIG. 7) in operation 604, and this new information is used for ongoing training of trained model 110.

Figure 7:
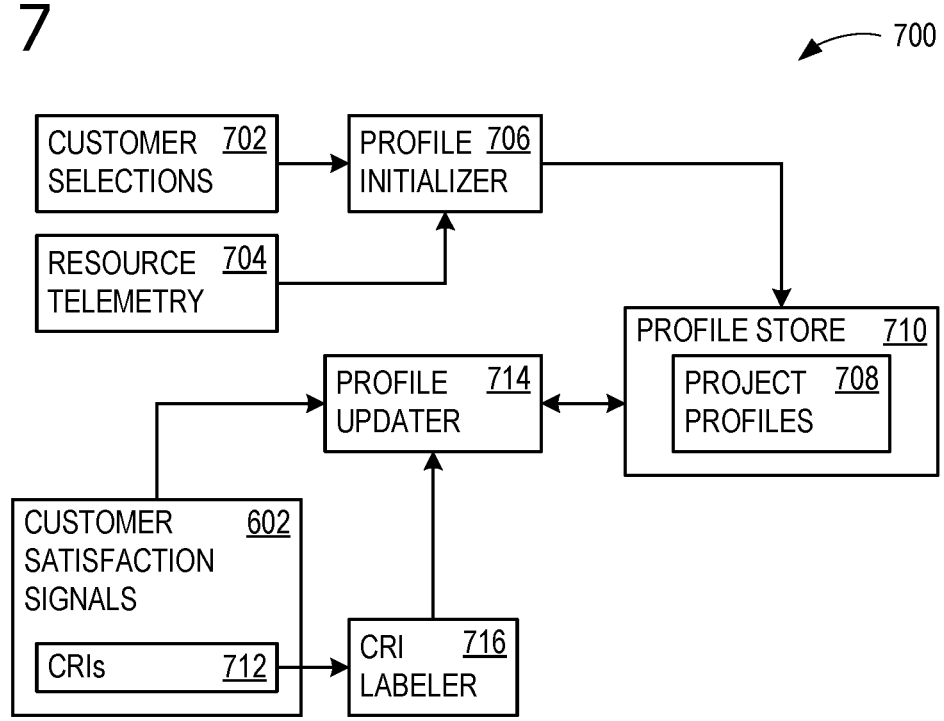
FIG. 7 illustrates a cost versus performance profiler loop, as may be used in example architectures such as that of FIG. 1.

FIG. 7 illustrates a cost versus performance profiler loop 700 that may be used in examples of architecture 100. Customer selections 702, provided via UI 800 (shown in FIG. 8) and resource telemetry 704 (e.g., utilization data, slack data, and throttling data) are provided to a profile initializer 706, which creates project profiles 708 persisted in a profile store 710. Customer satisfaction signals 602, which includes CRIs 712, are used to update project profiles 708 (as mentioned in relation to FIG. 6). This is accomplished by providing customer satisfaction signals 602 to a profile updater 714. Profile updater 714 performs the updating of project profiles 708 in profile store 710.

CRIs 712 are sent to profile updater 714 via a CRI labeler 716, to be labeled as cost-sensitive or performance-sensitive. In some examples, profile updater 714 uses an LLM to extract a representation of each CRI.

FIG. 8 illustrates UI 800. A subscription number window 802 displays the subscription number for the current project (e.g., the project for which pre-build configuration 140 is being generated). An offering selection window 804 displays offerings O as small production 804*a* (e.g., general purpose), large production 804*b* (e.g., memory optimized), and development 804*c* (e.g., burstable). As illustrated, a build target selection 806 is currently set to large production 804*b*, but may be changed by the customer, after the customer sees pre-build configuration 140 displayed in a model prediction window 820.

A cost and performance balance point selection slider 808 enables the customer to indicate a selected cost and performance balance point 810, although other input schemes may be used. The user clicks a "Generate" button 812 to generate pre-build configuration 140, at which point trained model 110 generates pre-build configuration 140 and UI 800 displays pre-build configuration 140 in model prediction window 820. As illustrated, model prediction window 820 displays a processor count 820*a*, an amount of memory 820*b*, and a storage capacity 820*c* for pre-build configuration 140. Some examples may display different or additional information.

Upon the customer changing build target selection 806 in offering selection window 804, and/or changing selected cost and performance balance point 810 on cost and performance balance point selection slider 808, and clicking the "Generate" button 812 to generate a new version of pre-build configuration 140. A model explainability window 830 displays information 830*a* for prior-existing computational resource 102*b* that was used to generate pre-build configuration 140, and at least a portion of hierarchy 500—in those examples that provide explainability.

The amount and type of information displayed in model explainability window 830 is adjusted using an explainability setting selection 816 within an explainability setting selection window 814. As illustrated, explainability setting selection window 814 shows two options, show other instances in bucket selection 814*a*, and Show histogram in log scale selection 814*b*. Other selections options may be provided instead or in addition to those shown, in some examples. An information window 818 provides additional information to the customer, regarding other options the customer may wish to attempt or use.

Figure 9:
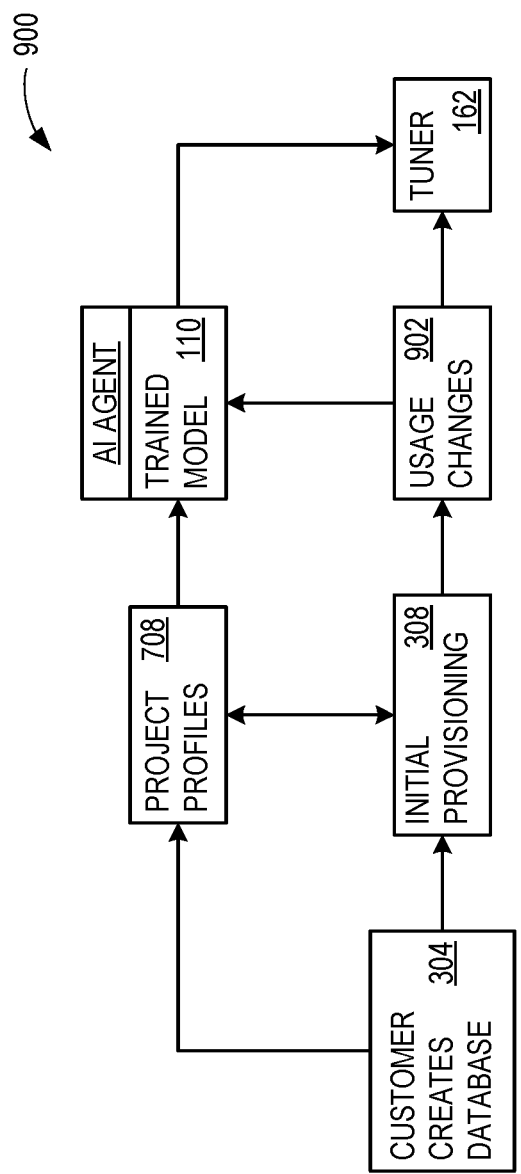
FIG. 9 illustrates an example feedback flow, as may be used in example architectures such as that of FIG. 1.

FIG. 9 illustrates an example feedback flow 900, as may be used in examples of architecture 100. A customer creates a database in operation 304, and initial provisioning operation 308 in which builder 142 builds computational resource 144 based on pre-build configuration 140, as described above for FIG. 3. In parallel, the new database, is a new project which results in a new project profile in project profiles 708, as described for FIG. 7. Usage changes 902 for computational resource 144 trigger scaling actions (e.g., scale up or scale down) by tuner 162.

Figure 10:
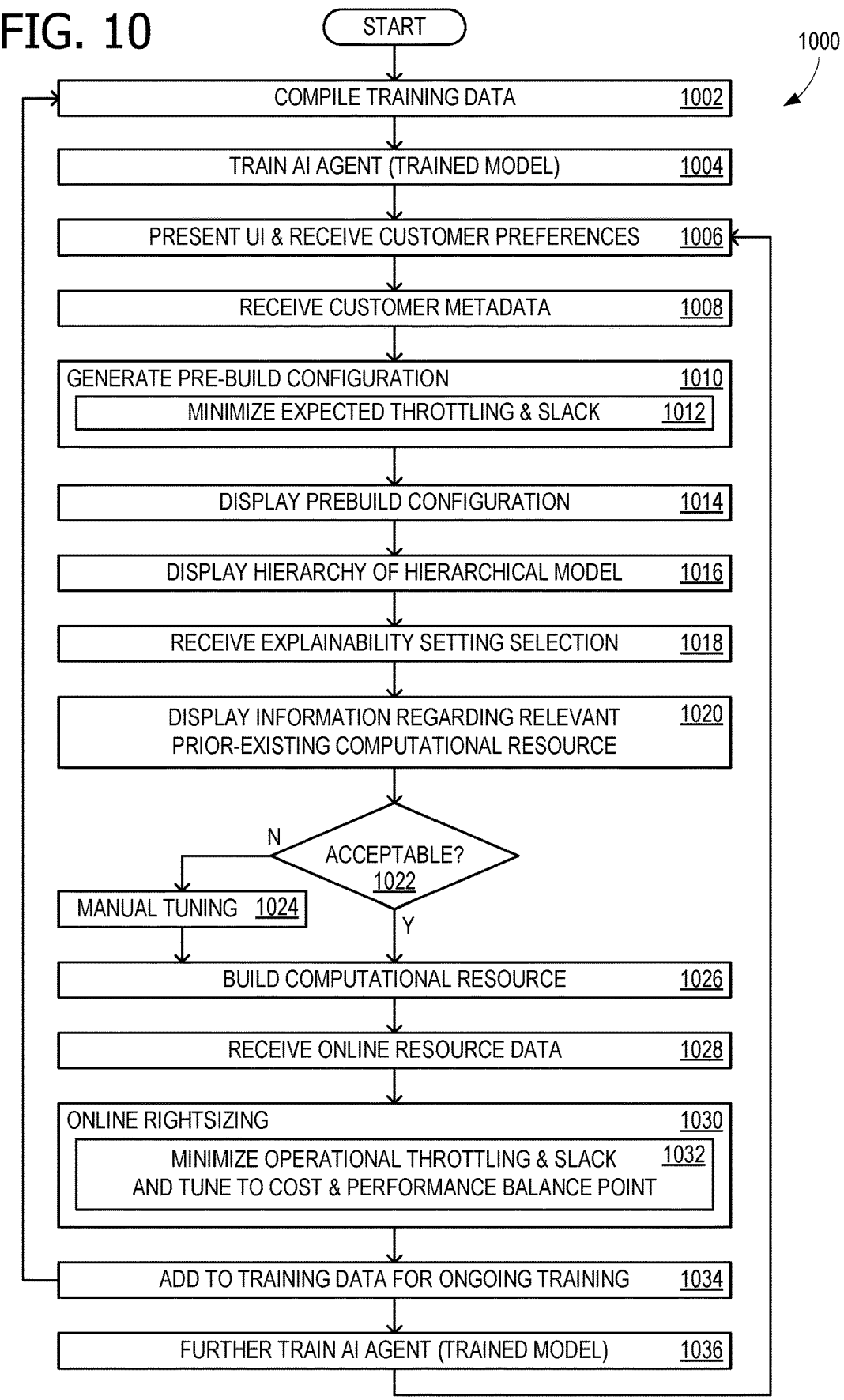
FIGS. 10 and 11 show flowcharts illustrating exemplary operations that may be performed when using example architectures such as that of FIG. 1.

FIG. 10 shows a flowchart 1000 illustrating exemplary operations that may be performed by architecture 100. In some examples, operations described for flowchart 1000 are performed by computing device 1200 of FIG. 12. Flowchart 1000 commences with compiling tenant data as historical data 104 (e.g., including customer metadata 104*a*, resource solution history 104*b*, and resource health and utilization history 104*c*) into training data for use in training trained model 110, in operation 1002.

In operation 1004, trainer 106 trains trained model 110, which in some examples includes: training capacity model 112 to perform capacity sizing for capacity prediction model 130 based on at least utilization data 122, training workload prediction model 114 to perform workload prediction for capacity prediction model 130 based on at least project metadata 124, and training balancing model 116 to perform capacity sizing for capacity prediction model 130 based on at least project history data 126.

Operation 1006 presents UI 800 to a customer to receive customer preferences in the form of selections within UI 800. This includes initial build target selection 806 and selected cost and performance balance point 810. The customer may change build target selection 806 and/or selected cost and performance balance point 810 at a later time, though.

Alternatively or in addition, either or both of initial build target selection 806 and cost and performance balance point 810 may be automatically inferred via one or more of the ML models described herein, without requiring any UI input from the customer. For example, for initial build target selection 806, one of the options of "burstable, general purpose, memory optimized" is automatically chosen as an internal policy or property of the new resource based on an ML model. The underlying infrastructure applies and transitions among such internal policies, as opposed to the customer inputting and managing initial build target selection 806 via UI 800.

Similarly, an ML model predicts cost and performance balance point 810 via the customer's past scale action and incident data (e.g., CRI). The ML model is applied to a new resource, and the ML model is tuned as part of the feedback loop via data from any manual scaling of the new resource, and/or via CRI data.

In operation 1008, trained model 110 receives customer metadata (e.g., customer metadata 104*d*). In operation 1010, trained model 110 creates capacity prediction model 130 using utilization data 122 and project metadata 124, and capacity prediction model 130 generates pre-build configuration 140 for computational resource 144. This includes minimizing expected throttling an slack by optimizing pre-build configuration 140 in order to target slack rate 216 and target throttling rate 214, in operation 1012.

Operation 1014 displays at least a portion of pre-build configuration 140 in UI 800 (e.g., displays processor count, amount of memory, and/or storage capacity). Operation 1016 displays at least a portion of hierarchy 500 of capacity prediction model 130 in UI 800. Operation 1018 receives explainability setting selection 816 through UI 800. Operation 1020 displays information for prior-existing computational resource 102*b* used in generating capacity prediction model 130, in UI 800.

In decision operation 1022, the customer determines whether pre-build configuration 140 is acceptable for the customer's needs. If not, the customer has the option to perform manual tuning in operation 1024. When the customer is satisfied with pre-build configuration 140, flowchart 1000 moves on. Builder 142 builds computational resource 144 in accordance with pre-build configuration 140 in operation 1026. Computational resource 144 begins executing in operation 1028, receiving input data 152 to generate output data 154 and receiving online resource data (e.g., new resource solution history 104e and resource health and utilization history 104f).

Operation 1030 performs online rightsizing to tune computational resource 144, using tuner 162, to a more optimal capacity. This includes minimizing operational throttling and slack, while adjusting computational resource 144 according to selected cost and performance balance point 810.

Operation 1036 adds to (e.g., further compiles) historical data 104, including customer metadata 104a, resource solution history 104b, and resource health and utilization history 104c, so that historical data 104 now includes pre-build configuration 140 and utilization data 164 for computational resource 144. In operation 1038, trainer 106 further trains capacity model 112, workload prediction model 114, and/or balancing model 116 using customer metadata 104a and resource solution history 104b.

Figure 11:
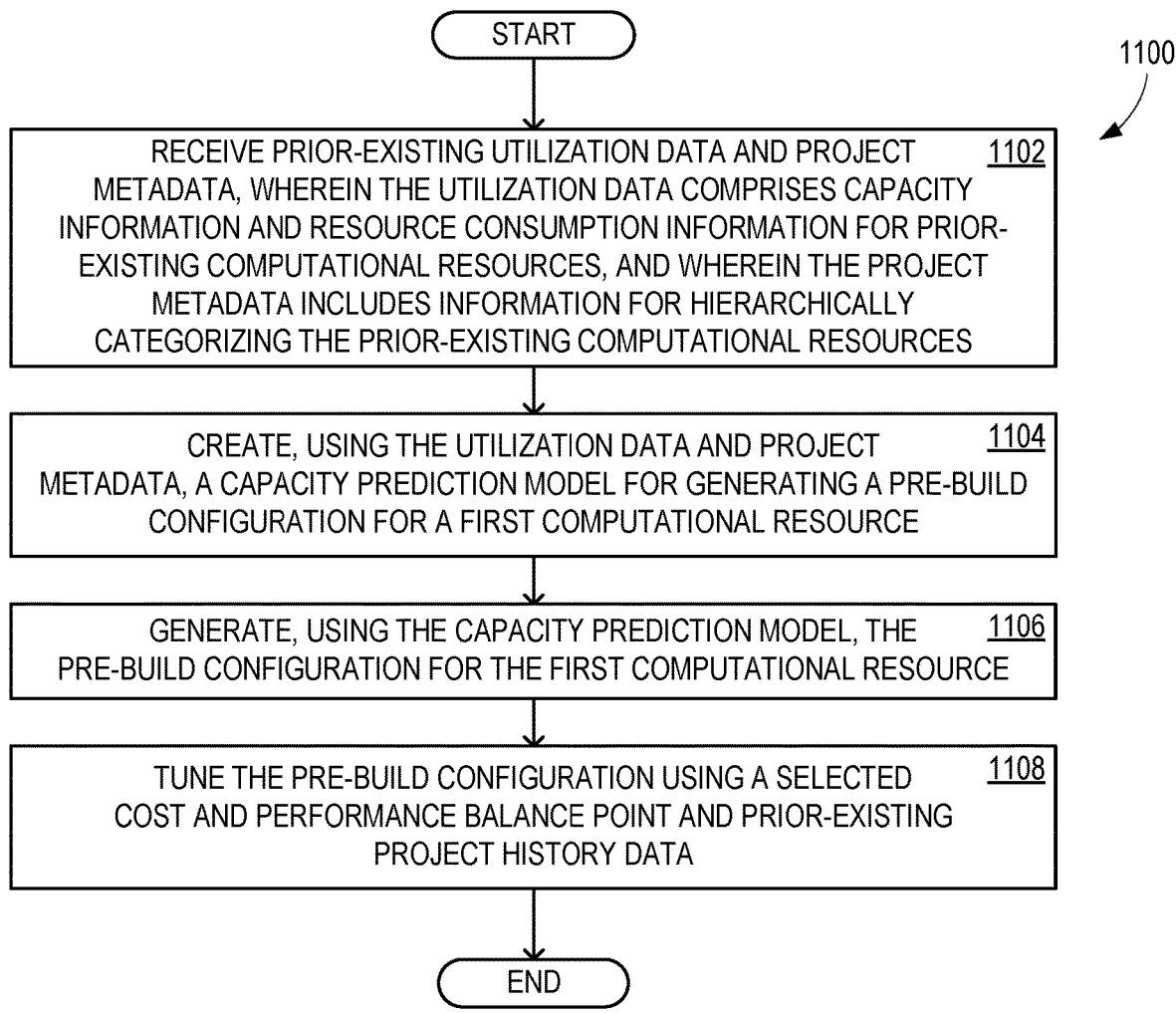

FIG. 11 shows a flowchart 1100 illustrating exemplary operations that may be performed by architecture 100. In some examples, operations described for flowchart 1100 are performed by computing device 1200 of FIG. 12. Flowchart 1100 commences with operation 1102, which includes receiving prior-existing utilization data and project metadata, wherein the utilization data comprises capacity information and resource consumption information for prior-existing computational resources, and wherein the project metadata includes information for hierarchically categorizing the prior-existing computational resources.

Operation 1104 includes creating, using the utilization data and project metadata, a capacity prediction model for generating a pre-build configuration for a first computational resource. Operation 1106 includes generating, using the capacity prediction model, the pre-build configuration for the first computational resource. Operation 1108 includes tuning the pre-build configuration using a selected cost and performance balance point and prior-existing project history data.

Additional Examples

An example system comprises: a processor; and a computer-readable medium storing instructions that are operative upon execution by the processor to: receive prior-existing utilization data and project metadata, wherein the utilization data comprises capacity information and resource consumption information for prior-existing computational resources, and wherein the project metadata includes information for hierarchically categorizing the prior-existing computational resources; create, using the utilization data and project metadata, a capacity prediction model for generating a pre-build configuration for a first computational resource; generate, using the capacity prediction model, the pre-build configuration for the first computational resource; and tune the pre-build configuration using a selected cost and performance balance point and prior-existing project history data.

An example computer-implemented method comprises: receiving prior-existing utilization data and project metadata, wherein the utilization data comprises capacity information and resource consumption information for prior-existing computational resources, and wherein the project metadata includes information for hierarchically categorizing the prior-existing computational resources; creating, using the utilization data and project metadata, a capacity prediction model for generating a pre-build configuration for a first computational resource; generating, using the capacity prediction model, the pre-build configuration for the first computational resource, the pre-build configuration comprises processor count, amount of memory, and/or storage capacity for the first computational resource; and tuning the pre-build configuration using a selected cost and performance balance point and prior-existing project history data.

One or more example computer storage devices have computer-executable instructions stored thereon, which, on execution by a computer, cause the computer to perform operations comprising: receiving prior-existing utilization data and project metadata, wherein the utilization data comprises capacity information and resource consumption information for prior-existing computational resources, and wherein the project metadata includes information for hierarchically categorizing the prior-existing computational resources; creating, using the utilization data and project metadata, a capacity prediction model for generating a pre-build configuration for a first computational resource; generating, using the capacity prediction model, the pre-build configuration for the first computational resource; tuning the pre-build configuration using a selected cost and performance balance point and prior-existing project history data; and building the first computational resource in accordance with the pre-build configuration.

Alternatively, or in addition to the other examples described herein, examples include any combination of the following:

the pre-build configuration comprises processor count, amount of memory, and/or storage capacity for the first computational resource;

building the first computational resource in accordance with the pre-build configuration;

receiving input data by the first computational resource;

generating output data using the first computational resource, based on at least the input data;

the capacity information comprises processor count, amount of memory, and/or storage capacity for the prior-existing computational resources;

the resource consumption information comprises slack information and throttling information for the prior-existing computational resources;

the project history data comprises requested changes or reported incidents for the prior-existing computational resources;

training a first model to perform capacity sizing for the capacity prediction model based on at least the utilization data;

training a second model to perform workload prediction for the capacity prediction model based on at least the project metadata;

training a third model to perform capacity sizing for the capacity prediction model based on at least the project history data;

presenting a UI;

receiving, through the UI, an initial build target selection, wherein generating the pre-build configuration for the first computational resource comprises generating the pre-build configuration for the first computational resource based on at least the initial build target selection;

receiving, through the UI, the selected cost and performance balance point;

displaying, in the UI, at least a portion of the pre-build configuration;

displaying, in the UI, at least a portion of a hierarchy of the capacity prediction model;

displaying, in the UI, information for a prior-existing computational resource used in generating the capacity prediction model;

generating the pre-build configuration comprises optimizing the pre-build configuration for a target slack rate and a target throttling rate;

tuning the pre-build configuration comprises optimizing the pre-build configuration for a target slack rate and a target throttling rate;

the first multi-model, the second multi-model, and the third multi-model each comprises an ML model;

the first multi-model, the second multi-model, and the third multi-model are each within a fourth model;

each processor in the processor count comprises a virtual core;

receiving, through the UI, an explainability setting selection;

compiling a configuration history and a computational resource history;

further training the first model, the second model, and/or the third model using the configuration history and the computational resource history;

the configuration history includes the pre-build configuration; and the computational resource history includes utilization data for the first computational resource.

While the aspects of the disclosure have been described in terms of various examples with their associated operations, a person skilled in the art would appreciate that a combination of operations from any number of different examples is also within scope of the aspects of the disclosure.

Example Operating Environment

Figure 12:
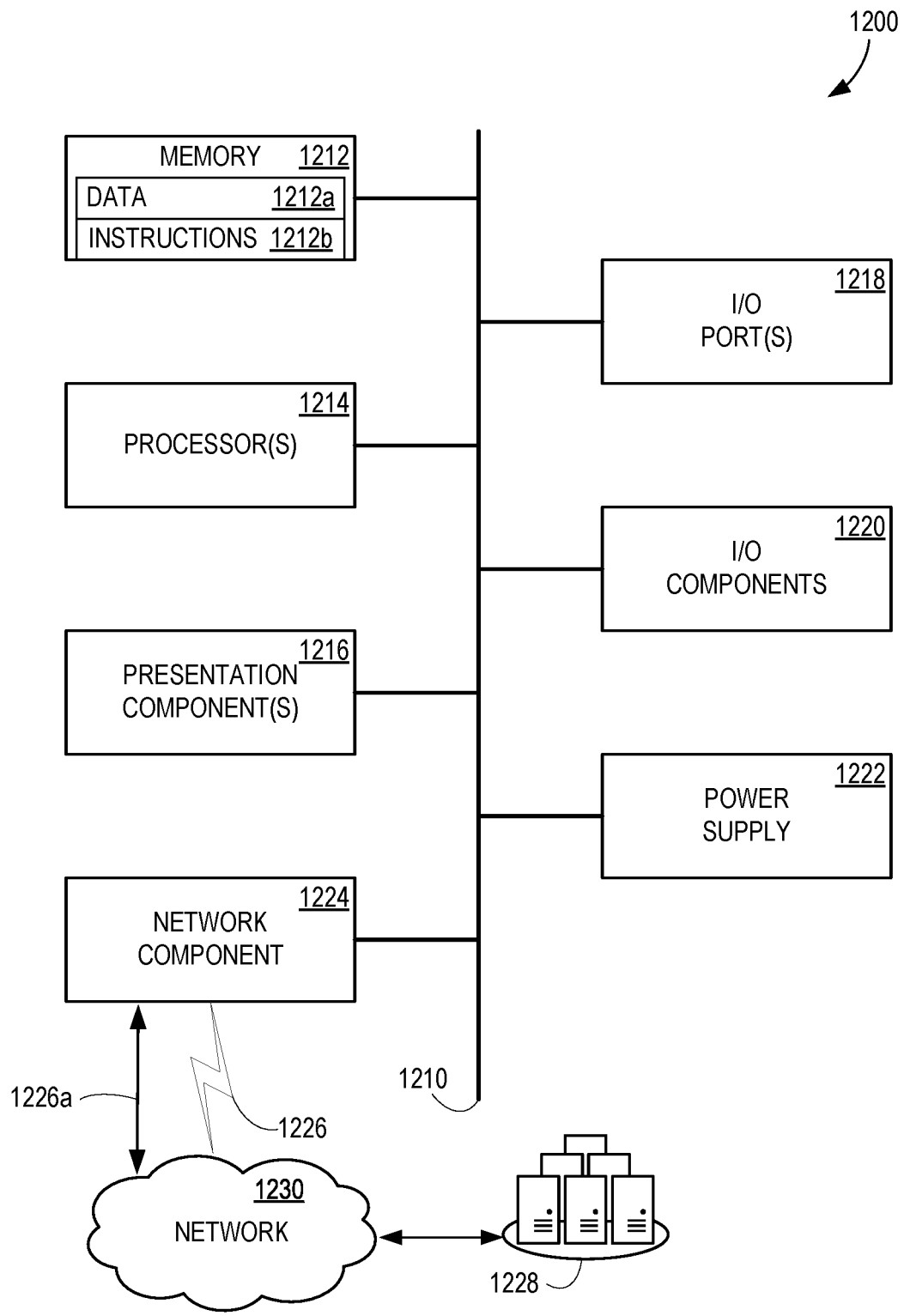
FIG. 12 shows a block diagram of an example computing device suitable for implementing some of the various examples disclosed herein.

FIG. 12 is a block diagram of an example computing device 1200 (e.g., a computer storage device) for implementing aspects disclosed herein, and is designated generally as computing device 1200. In some examples, one or more computing devices 1200 are provided for an on-premises computing solution. In some examples, one or more computing devices 1200 are provided as a cloud computing solution. In some examples, a combination of on-premises and cloud computing solutions are used. Computing device 1200 is but one example of a suitable computing environment and is not intended to suggest any limitation as to the scope of use or functionality of the examples disclosed herein, whether used singly or as part of a larger set.

Neither should computing device 1200 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1200 includes a bus 1210 that directly or indirectly couples the following devices: computer storage memory 1212, one or more processors 1214, one or more presentation components 1216, input/output (I/O) ports 1218, I/O components 1220, a power supply 1222, and a network component 1224. While computing device 1200 is depicted as a seemingly single device, multiple computing devices 1200 may work together and share the depicted device resources. For example, memory 1212 may be distributed across multiple devices, and processor(s) 1214 may be housed with different devices.

Bus 1210 represents what may be one or more buses (such as an address bus, data bus, or a combination thereof). Although the various blocks of FIG. 12 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 12 and the references herein to a "computing device." Memory 1212 may take the form of the computer storage media referenced below and operatively provide storage of computer-readable instructions, data structures, program modules and other data for the computing device 1200. In some examples, memory 1212 stores one or more of an operating system, a universal application platform, or other program modules and program data. Memory 1212 is thus able to store and access data 1212a and instructions 1212b that are executable by processor 1214 and configured to carry out the various operations disclosed herein. Thus, computing device 1200 comprises a computer storage device having computer-executable instructions 1212b stored thereon.

In some examples, memory 1212 includes computer storage media. Memory 1212 may include any quantity of memory associated with or accessible by the computing device 1200. Memory 1212 may be internal to the computing device 1200 (as shown in FIG. 12), external to the computing device 1200 (not shown), or both (not shown). Additionally, or alternatively, the memory 1212 may be distributed across multiple computing devices 1200, for example, in a virtualized environment in which instruction processing is carried out on multiple computing devices 1200. For the purposes of this disclosure, "computer storage media," "computer storage memory," "memory," and "memory devices" are synonymous terms for the memory 1212, and none of these terms include carrier waves or propagating signaling.

Processor(s) 1214 may include any quantity of processing units that read data from various entities, such as memory 1212 or I/O components 1220. Specifically, processor(s) 1214 are programmed to execute computer-executable instructions for implementing aspects of the disclosure. The instructions may be performed by the processor, by multiple processors within the computing device 1200, or by a processor external to the client computing device 1200. In some examples, the processor(s) 1214 are programmed to execute instructions such as those illustrated in the flow charts discussed below and depicted in the accompanying drawings. Moreover, in some examples, the processor(s) 1214 represents an implementation of analog techniques to perform the operations described herein. For example, the operations may be performed by an analog client computing device 1200 and/or a digital client computing device 1200. Presentation component(s) 1216 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1200, across a wired connection, or in other ways. I/O ports 1218 allow computing device 1200 to be logically coupled to other devices including I/O components 1220, some of which may be built in. Example I/O components 1220 include, for example but without limitation, a microphone, joystick, game pad, satellite dish, scanner, printer, wireless device, etc.

Computing device 1200 may operate in a networked environment via the network component 1224 using logical connections to one or more remote computers. In some examples, the network component 1224 includes a network interface card and/or computer-executable instructions (e.g., a driver) for operating the network interface card. Communication between the computing device 1200 and other devices may occur using any protocol or mechanism over any wired or wireless connection. In some examples, network component 1224 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1224 communicates over wireless communication link 1226 and/or a wired communication link 1226a to a remote resource 1228 (e.g., a cloud resource) across network 1230. Various different examples of communication links 1226 and 1226a include a wireless connection, a wired connection, and/or a dedicated link, and in some examples, at least a portion is routed through the internet.

Although described in connection with an example computing device 1200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure do not include signals. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
   receive prior-existing utilization data and project metadata, wherein the utilization data comprises capacity information and resource consumption information for prior-existing computational resources, and wherein the project metadata includes information for hierarchically categorizing the prior-existing computational resources;
   create, using the utilization data and project metadata, a capacity prediction model for generating a pre-build configuration for a first computational resource;
   generate, using the capacity prediction model, the pre-build configuration for the first computational resource; and
   tune the pre-build configuration using a selected cost and performance balance point and prior-existing project history data.

2. The system of claim 1, wherein the instructions are further operative to:
   build the first computational resource in accordance with the pre-build configuration, the pre-build configuration comprising a processor count, amount of memory, and/or storage capacity for the first computational resource.

3. The system of claim 2, wherein the instructions are further operative to:
   receive input data by the first computational resource; and
   generate output data using the first computational resource, based on at least the input data.

4. The system of claim 1,
   wherein the capacity information comprises processor count, amount of memory, and/or storage capacity for the prior-existing computational resources;
   wherein the resource consumption information comprises slack information and throttling information for the prior-existing computational resources; and
   wherein the project history data comprises requested changes or reported incidents for the prior-existing computational resources.

5. The system of claim 1, wherein the instructions are further operative to:
   train a first model to perform capacity sizing for the capacity prediction model based on at least the utilization data;
   train a second model to perform workload prediction for the capacity prediction model based on at least the project metadata; and
   train a third model to perform capacity sizing for the capacity prediction model based on at least the project history data.

6. The system of claim 1, wherein the instructions are further operative to:
   present a user interface (UI);
   receive, through the UI, an initial build target selection, wherein generating the pre-build configuration for the first computational resource comprises generating the pre-build configuration for the first computational resource based on at least the initial build target selection;
   receive, through the UI, the selected cost and performance balance point; and
   display, in the UI, at least a portion of the pre-build configuration.

7. The system of claim 6, wherein the instructions are further operative to:
   display, in the UI, at least a portion of a hierarchy of the capacity prediction model; and
   display, in the UI, information for a prior-existing computational resource used in generating the capacity prediction model.

8. A computer-implemented method comprising:
   receiving prior-existing utilization data and project metadata, wherein the utilization data comprises capacity information and resource consumption information for prior-existing computational resources, and wherein the project metadata includes information for hierarchically categorizing the prior-existing computational resources;
   creating, using the utilization data and project metadata, a capacity prediction model for generating a pre-build configuration for a first computational resource;
   generating, using the capacity prediction model, the pre-build configuration for the first computational resource, the pre-build configuration comprises processor count, amount of memory, and/or storage capacity for the first computational resource; and
   tuning the pre-build configuration using a selected cost and performance balance point and prior-existing project history data.

9. The computer-implemented method of claim 8, further comprising:
   building the first computational resource in accordance with the pre-build configuration;
   receiving input data by the first computational resource; and
   generating output data using the first computational resource, based on at least the input data.

10. The computer-implemented method of claim 8,
   wherein the capacity information comprises processor count, amount of memory, and/or storage capacity for the prior-existing computational resources;
   wherein the resource consumption information comprises slack information and throttling information for the prior-existing computational resources; and
   wherein the project history data comprises requested changes or reported incidents for the prior-existing computational resources.

11. The computer-implemented method of claim 8, further comprising:
   training a first model to perform capacity sizing for the capacity prediction model based on at least the utilization data;
   training a second model to perform workload prediction for the capacity prediction model based on at least the project metadata; and
   training a third model to perform capacity sizing for the capacity prediction model based on at least the project history data.

12. The computer-implemented method of claim 8, further comprising:
   presenting a user interface (UI);
   receiving, through the UI, an initial build target selection, wherein generating the pre-build configuration for the first computational resource comprises generating the pre-build configuration for the first computational resource based on at least the initial build target selection;

receiving, through the UI, the selected cost and performance balance point; and displaying, in the UI, at least a portion of the pre-build configuration.

13. The computer-implemented method of claim 12, further comprising:

displaying, in the UI, at least a portion of a hierarchy of the capacity prediction model; and displaying, in the UI, information for a prior-existing computational resource used in generating the capacity prediction model.

14. The computer-implemented method of claim 8, wherein generating the pre-build configuration and tuning the pre-build configuration each comprises optimizing the pre-build configuration for a target slack rate and a target throttling rate.

15. A computer storage device having computer-executable instructions stored thereon, which, on execution by a computer, cause the computer to perform operations comprising:

receiving prior-existing utilization data and project metadata, wherein the utilization data comprises capacity information and resource consumption information for prior-existing computational resources, and wherein the project metadata includes information for hierarchically categorizing the prior-existing computational resources;

creating, using the utilization data and project metadata, a capacity prediction model for generating a pre-build configuration for a first computational resource;

generating, using the capacity prediction model, the pre-build configuration for the first computational resource;

tuning the pre-build configuration using a selected cost and performance balance point and prior-existing project history data; and building the first computational resource in accordance with the pre-build configuration, the pre-build configuration comprising a processor count, amount of memory, and/or storage capacity for the first computational resource.

16. The computer storage device of claim 15, wherein the operations further comprise:

receiving input data by the first computational resource; and generating output data using the first computational resource, based on at least the input data.

17. The computer storage device of claim 15, wherein the operations further comprise:

wherein the capacity information comprises processor count, amount of memory, and/or storage capacity for the prior-existing computational resources;

wherein the resource consumption information comprises slack information and throttling information for the prior-existing computational resources; and wherein the project history data comprises requested changes or reported incidents for the prior-existing computational resources.

18. The computer storage device of claim 15, wherein the operations further comprise:

training a first model to perform capacity sizing for the capacity prediction model based on at least the utilization data;

training a second model to perform workload prediction for the capacity prediction model based on at least the project metadata; and training a third model to perform capacity sizing for the capacity prediction model based on at least the project history data.

19. The computer storage device of claim 15, wherein the operations further comprise:

presenting a user interface (UI);

receiving, through the UI, an initial build target selection, wherein generating the pre-build configuration for the first computational resource comprises generating the pre-build configuration for the first computational resource based on at least the initial build target selection;

receiving, through the UI, the selected cost and performance balance point; and displaying, in the UI, at least a portion of the pre-build configuration.

20. The computer storage device of claim 19, wherein the operations further comprise:

receiving, through the UI, an explainability setting selection;

displaying, in the UI, at least a portion of a hierarchy of the capacity prediction model; and displaying, in the UI, information for a prior-existing computational resource used in generating the capacity prediction model.

* * * * *